(12) United States Patent
Dorenbosch et al.

(10) Patent No.: US 6,768,726 B2
(45) Date of Patent: Jul. 27, 2004

(54) METHOD AND APPARATUS FOR EFFECTING A SEAMLESS HANDOFF BETWEEN IP CONNECTIONS

(75) Inventors: Jheroen P. Dorenbosch, Paradise, TX (US); Richard L. Bennett, Southlake, TX (US); David L. Raymer, Watauga, TX (US)

(73) Assignee: Motorola, Inc., Schaumburg, IL (US)

( * ) Notice: Subject to any disclaimer, the term of this patent is extended or adjusted under 35 U.S.C. 154(b) by 49 days.

(21) Appl. No.: 10/212,942

(22) Filed: Aug. 6, 2002

(65) Prior Publication Data

US 2004/0028009 A1 Feb. 12, 2004

(51) Int. Cl.[7] .................. H04L 12/28; H04L 12/58; H04Q 7/00
(52) U.S. Cl. .................. 370/331; 370/389; 370/401
(58) Field of Search .................. 370/401, 465, 370/392, 389, 394, 331, 352, 218

(56) References Cited

U.S. PATENT DOCUMENTS

| | | | | |
|---|---|---|---|---|
| 2002/0075900 A1 | * | 6/2002 | Turina et al. | 370/467 |
| 2002/0105926 A1 | * | 8/2002 | Famolari et al. | 370/331 |
| 2002/0141360 A1 | * | 10/2002 | Baba et al. | 370/331 |
| 2002/0172209 A1 | * | 11/2002 | Ohta et al. | 370/401 |
| 2003/0212764 A1 | * | 11/2003 | Trossen et al. | 709/219 |

* cited by examiner

Primary Examiner—Hassan Kizou
Assistant Examiner—Timothy Lee
(74) Attorney, Agent, or Firm—Posz & Bethards, PLC; Charles W. Bethards

(57) ABSTRACT

A method 900 of and apparatus for effecting a handoff from a first Internet Protocol (IP) connection 221 to a second IP connection 331 is disclosed. The method includes: communicating a packet data communication between a first station and a gateway (either acting as an application level gateway or as and endpoint for an SCTP tunnel) using the first IP connection and a first IP address for the first station, the gateway relaying the packet data communication with a second station; setting up the second IP connection with a second IP address for the first station, the first IP connection being a primary connection and the second IP connection being a secondary connection between the first station and the gateway, the first and the second IP connection existing concurrently; determining that the second IP connection should be the primary connection between the first station and the gateway; and changing the second IP connection to the primary connection by informing the gateway that the second IP address is the primary address using stream control transmission protocol (SCTP) messages, wherein the packet data communication is immediately switched over to the second IP connection.

37 Claims, 5 Drawing Sheets

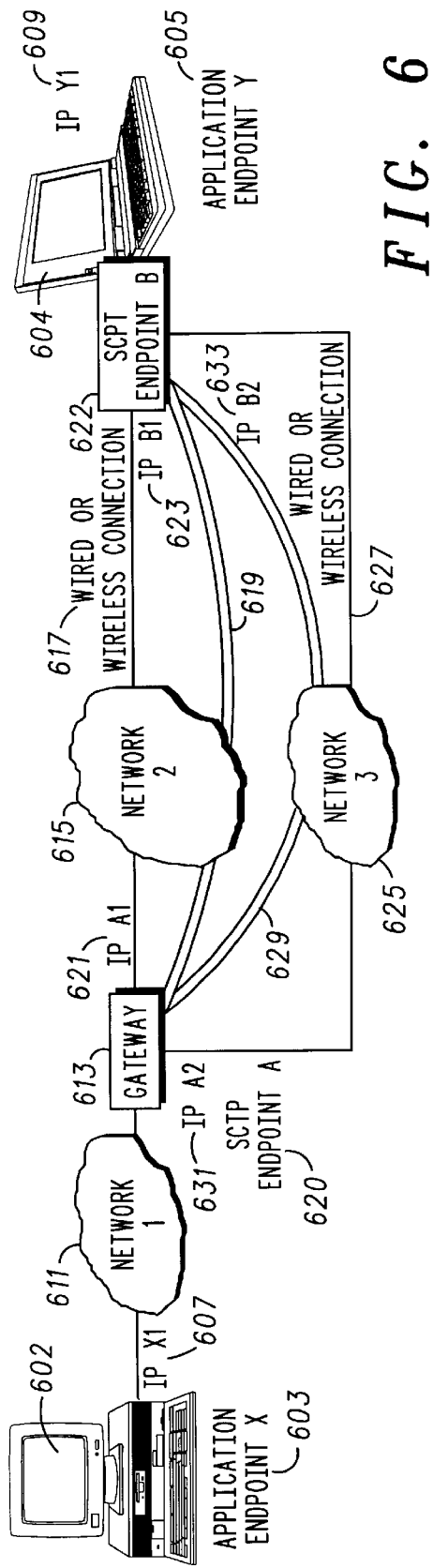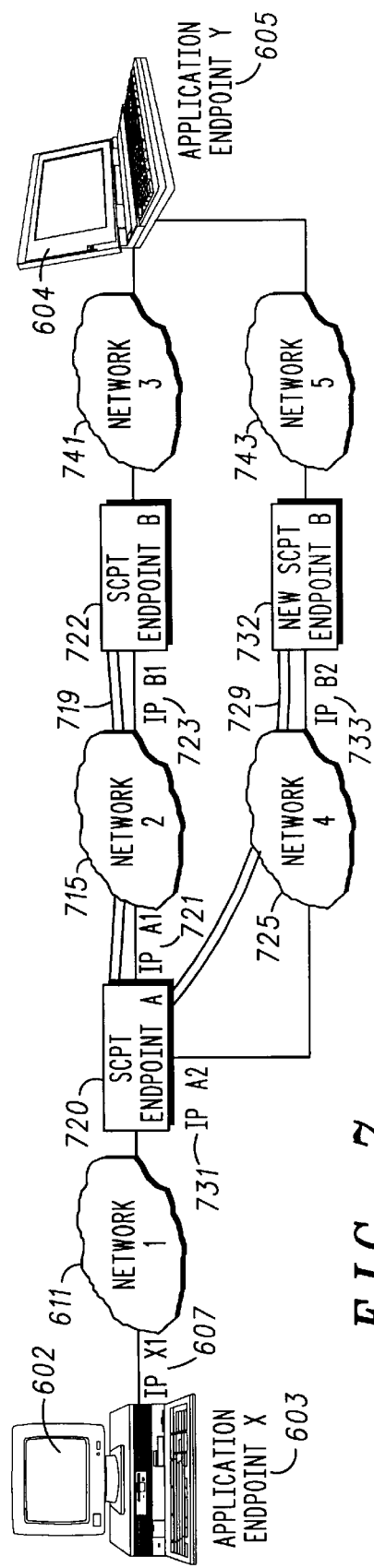

METHOD AND APPARATUS FOR EFFECTING A SEAMLESS HANDOFF BETWEEN IP CONNECTIONS

FIELD OF THE INVENTION

This invention relates in general to communication systems, and more specifically to a method and apparatus for effecting a seamless handoff of packet data communication from one IP connection to another.

BACKGROUND OF THE INVENTION

Communications systems are known and continue to evolve rapidly as is quite evident in wireless communications systems. Systems have and are being deployed that allow packet data enabled mobile stations access to packet data networks such as the Internet or internet like networks that utilize IP addresses and various packet data transport protocols such as internet protocol (IP), transport control protocol (TCP), Universal Datagram Protocol (UDP) and more recently stream control transmission protocol (SCTP). Many second and third generation cellular and cellular like systems, such as GPRS (general packet radio service), CDMA (code division multiple access) 2000, Wideband CDMA, UMTS (Universal mobile telecommunications service) rely on or support such packet data protocols. Such cellular systems are typically arranged and constructed to provide handoff for a communications from one cellular fixed point to another same cellular fixed point more or less transparent to or with little or no indication to a user of the system.

Other communications systems are gaining popularity and these may be characterized as small or local area systems, often wireless, that provide services to users, typically after proper authorization and authentication procedures have been successful. Such wireless systems include ones based on or designed around IEEE 802.11, for example. Most of these systems are designed to be low cost and largely intended to eliminate hooking up wires and cables. Thus these systems for the most part have not dealt with mobility issues, such as handing off a communications from one fixed or access point to another in the midst of a communications much less accepting or initiating handoffs from and to cellular or cellular like systems. Some 802.11 systems do have the ability to pick up a communication that has been dropped by one fixed point at another fixed point provided the fixed points are part of the same subnet, referred to as a basic services set or BSS in 802.11 systems, however this can take several seconds and is not suitable for handling mobile users with real-time or time critical needs.

Clearly a need exists for methods and apparatus for effecting a handoff of time critical communications from one IP connection to another. Preferably this will be transparent to the systems, network operators, and users and support legacy equipment and applications using TCP/UDP packet data.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 6 and FIG. 7 depict another embodiment of a system level diagram showing a handoff of communications between two IP connections using SCTP tunneling according to the present invention;

DETAILED DESCRIPTION OF PREFERRED EMBODIMENT

Figure 1:
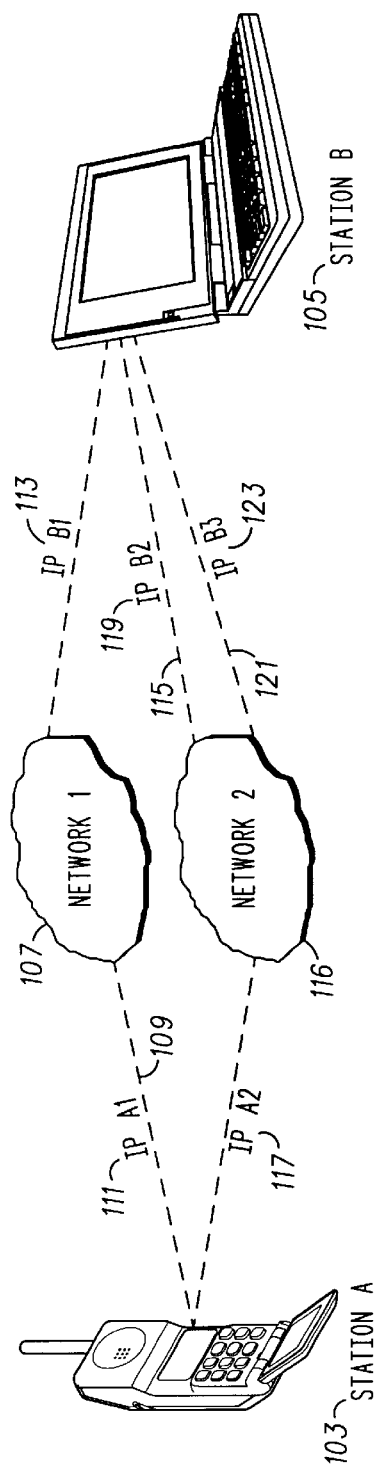
FIG. 1 depicts, in a simplified and exemplary form, a system level diagram of a communications system utilizing stream control transmission protocol to support multiple connections between stations.

In overview form the present disclosure concerns communications systems that provide service to wireless communications units or more specifically users thereof operating therein. More particularly various inventive concepts and principles embodied in methods and apparatus for effecting a handoff of packet data communications in a manner that supports time critical or real time communications from one IP connection to another using SCTP messages are disclosed and discussed. The communications systems of particular interest are at least partly wireless and are those being developed and deployed such as 802.11 local area systems and such local area systems together with second plus and third generation cellular and cellular like systems, such as GPRS (general packet radio service), CDMA (code division multiple access) 2000, Wideband CDMA, UMTS (Universal mobile telecommunications service) that need to address mobility concerns within the local areas systems and between the local area and other systems, such as cellular systems.

As further discussed below various inventive principles and combinations thereof are advantageously employed to induce a gateway, acting as an SCTP end point, or stations that are so acting and communicating with the gateway to set up alternative IP connections that may be used as required to effect a handoff when needed or desired without further intervention by the system components or equipment in a fashion that is transparent to the user and user communications, thus alleviating various problems associated with known systems provided these principles or equivalents thereof are utilized. By using the gateway, communications with legacy stations that use TCP or UDP packet data that are upstream from the gateway can be handed off to differing IP connections between the gateway and downstream stations.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts within the preferred embodiments.

Referring to FIG. 1 a simplified and exemplary system level diagram of a communications system utilizing stream control transmission protocol to support multiple IP connections between stations, specifically station A 103 and station B 105, will be discussed and described. In FIG. 1 Station A 103, depicted as a mobile or portable wireless communications unit, such as a cellular or subscriber handset or messaging unit or the like is in communication with station B 105 shown as a portable laptop computer via a first network 107 and first IP connection 109 with station A having a first IP address, IP A1 111 and station B having a first IP address, IP B1 113. Station A and station B are also sharing a second IP connection 115 via a second network 116 with station A having a second IP address, IP A2 117 and station B a second IP address, IP B2 119. A third IP connection 121 is shown with station A using its second IP address, IP A2 117 and station B using a third IP address, IP B3 123.

The above multiple connection arrangement is made possible using a relatively new transmission protocol, known as Stream Control Transmission Protocol (SCTP) that was recently standardized by the Internet Engineering Task Force (IETF). It operates at the same layer as TCP and UDP and can be viewed as a more capable version of TCP. SCTP was designed to provide a way for an application on an endpoint or station to manage concurrent reliable streams with another station such that the streams will not block each other. SCTP can also mix reliable streams with best effort streams. SCTP is also expected to increase availability by allowing a station to specify to another endpoint or station that it has more than one IP destination address. The other endpoint will pick one of the addresses as the primary destination address. When that address fails, the SCTP layer will automatically switch to an alternative destination address. The switching does not need any help from the application that uses the SCTP layer. Especially when the alternative addresses use different networks, system reliability goes up tremendously. However, an SCTP fail-over switching can take several seconds and thus is too slow for time critical communications such as voice or video. This disclosure discusses and discloses various concepts and principles that will address this concern.

SCTP does not allow an endpoint such as station A or B to change the addresses it has supplied to the other endpoint without first suspending and reinitializing the IP connection. It can also not specify which of the addresses should be used by the other endpoint as the primary destination address. SCTP is being extended to allow operators to change IP equipment within a station or endpoint without having to re-initialize the SCTP transport (see draft-ietf-tsvwg-addip-sctp-03.txt). The IETF draft defines SCTP extension messages that an endpoint can use to inform the other endpoint that; a destination address is to be deleted, a destination address is to be added, or a specified address is to be used as the primary destination address. These SCTP extension messages can be used in a novel and advantageous manner to support and effect a timely handoff between IP connections. Co-pending patent application by Dorenbosch et al., titled METHOD AND APPARATUS FOR EFFECTING A HANDOFF BETWEEN TWO IP CONNECTIONS FOR TIME CRITICAL COMMUNICATIONS, having a like filing date and assigned to the same assignee as here discusses a novel and inventive technique for effecting handoffs between stations using SCTP. Here we discuss and describe various aspects of a novel and inventive technique to effect the handoff even when one or more of the stations is using TCP/UDP schemes.

Figure 2:
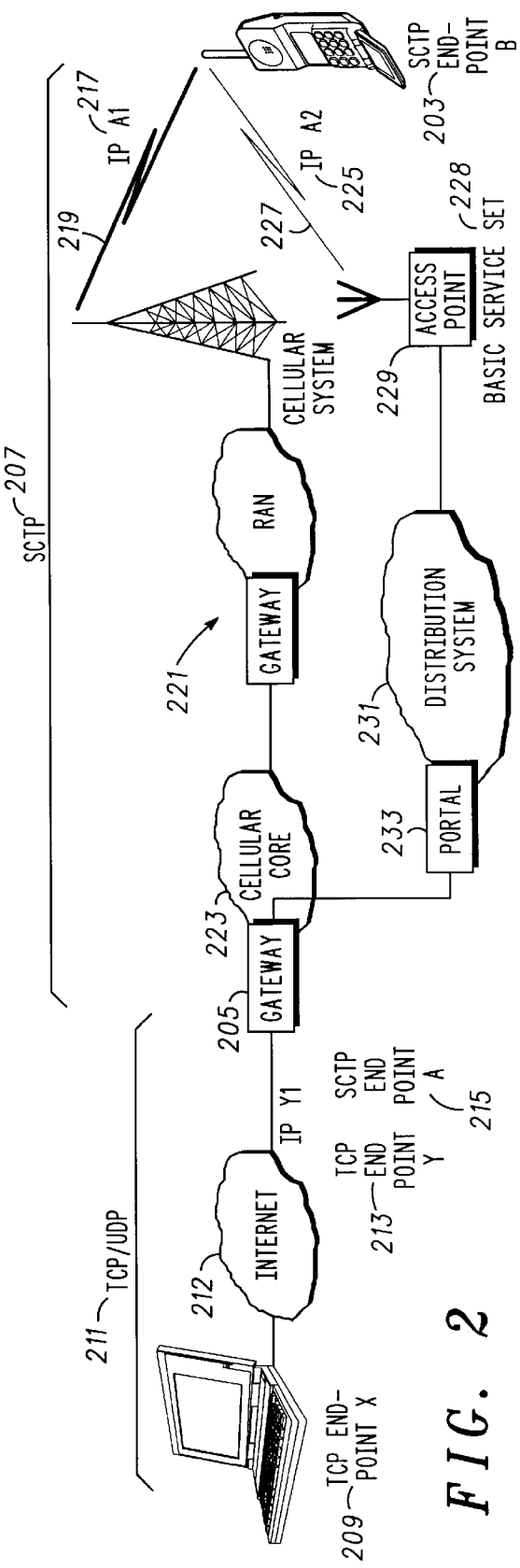
FIG. 2 is a system level diagram depicting a preferred embodiment of a handoff of communications between two IP connections according to the present invention.

Referring to FIG. 2 a system level diagram depicting a preferred embodiment of a system suitable for performing a seamless handoff, amongst two IP connections, of communications between a first station 203, SCTP end point B, and a gateway 205, will be described and discussed. The two IP connections between the first station 203 and the gateway utilize SCTP as a transport protocol 207. The gateway 205 facilitates and provides for communications between the first station and a second station 209 that is or may be running applications on TCP or UDP 211 by relaying communications with the second station, via, for example, the Internet 212. Thus the second station 209 is a TCP/UDP endpoint and the gateway 205 is a corresponding TCP/UDP endpoint 213 as well as an SCTP endpoint 215 for exchanges or communications with the first station 203. FIG. 2 depicts the first IP connection 219 using a first IP address, IP A1, 217 for the first station routed via a known cellular "access point" or network, specifically a Radio Access Network (RAN) and gateway 221 to a cellular core 223 and thus the gateway 205. In a UMTS and in a GPRS system, the gateway 205 can be a GGSN: a Gateway GSN, which stands for a Gateway GPRS Support Node. In a CDMA system, the Gateway can be a Packet Data Gateway. The second IP connection 227 using a second IP address, IP A2, 225 is routed via a basic service set 228, thus wireless IP access point, AP, 229 through a distribution system 231 and portal 233 to the gateway 205.

While FIG. 2 shows an IP connection via a cellular system and another via a wireless IP access point, specifically an IEEE 802.11 access point, it is important to note that any combination of wired and wireless networks or access points may advantageously use the inventive principles and concepts discussed and described herein. For example, various access points according to various known standards and technologies and evolutions thereof, such as HiperLan, Bluetooth, other local area network technologies, as well as varying forms of cellular and cellular like access technologies may be used and the concepts here disclosed can be used to effect a hand off within or between there respective systems or networks. One preferred aspect of the present disclosure that will focus on the requisites for doing so, uses an IEEE 802.11 network. We will digress briefly and introduce some constructs, definitions, and terminology that generally apply to 802.11 networks.

Wireless IP using 802.11 is becoming increasingly popular. For example, many of the popular coffee shops now provide 802.11b connectivity to their customers. Customers can browse the Internet or their company's intranet, read and reply to email while enjoying a latte. Wireless IP can also provide real time services such as Voice over IP and video conferencing. An 802.11 coverage area is called a Basic Service Set (BSS), such as BSS 228. The 802.11 standard supports Isolated BSSs with an ad-hoc network of mobile stations, but a typical BSS contains an Access Point (AP), such as access point 229, that provides a bridge to or access to other wireless and wired LANs, such as a distribution system 231 and from there via the portal 213 and gateway 205 to the Internet 213, for example.

Each BSS contains a single AP and a station, such as the first station or station B 203, can only associate with one AP at any one time. This association rule makes it possible to route or distribute IP data to the station in a defined manner, as it is known what AP is associated with the station. Station B has a destination address or IP address of IP A2 225 for this association or IP connection and messages with that address are routed via AP 229 to the station 203.

A mobile station such as station B 203 can roam from one BSS into the next BSS and connect to another AP. The 802.11 standards also define an Extended Services Set (ESS) of coordinated BSSs to simplify roaming. This for example may allow a customer to roam from the coffee shop into a neighboring bookstore and continue to browse the Internet assuming both establishments are part of the same ESS. The customer's station first breaks the connection or drops the association with the AP in the coffee shop and then associates with the AP in the bookstore. This can all occur fast enough to accommodate browser operation with a few second interruption, however, it is not fast enough for real time or time critical applications, such as voice or voice over IP and will not support handoffs between ESSs. Note that the above techniques work even if the handoff is between ESSs. In contrast, as the standards for 802.11 make clear, without the use of the principles and concepts herein described an ESS transition will result in disruption of services. This paragraph, while largely irrelevant to the situation depicted in FIG. 2 will help explain handoffs and the need therefore in systems where the handoff is between two wireless IP access points.

As an overview, the handoff from the cellular system to the wireless IP network shown in FIG. 2 includes setting up or initiating the first IP connection by informing the gateway 205 of the first IP address, IP A1, 217 using SCTP. Preferably this will be done by the first station 203. Then the method includes communicating a packet data communication, using an application that runs on SCTP, between station B 203 and the gateway using the first IP connection 219 and first IP address 217 for station B through the cellular network where the gateway does address translation and protocol translation, SCTP to or from TCP/UDP, and relays the packet data communication with (to or from) the second station 209. After setting up and using the first IP connection the next requirement for a seamless handoff is setting up the second IP connection 227 with a second IP address 225 for station B 203, where the first IP connection with the gateway remains a primary connection and the second IP connection is a secondary connection, with both existing concurrently. Then determining that the second IP connection should be the primary connection; and changing the second IP connection to the primary connection by informing the gateway that the second IP address is the primary address using SCTP messages, wherein the packet data communication is immediately switched over to the second IP connection completes the seamless handoff.

Referring to FIG. 2, the mobile or portable station, station B 203 will initially not be in an 802.11 BSS or coverage area or if within the coverage area not be interested in setting up an association or IP connection with the wireless IP access point 229. The mobile has registered with the cellular system. The mobile station 203 must obtain at least one IP address (Y1) that maps external traffic for the station B into the gateway 205, shown as part of the cellular system. This address can be obtained in a known way (like PDP context activation in UMTS). Hence, all traffic for the mobile station on address Y1 will be routed to the gateway. The gateway will forward the traffic to the mobile station on IP address A1. Endpoint X is using TCP/UDP when communicating with address Y1 and is not aware that the gateway will change the transport layer such that SCTP is used for communication over the cellular system. The mobile endpoint may or may not use additional IP addresses over the cellular connection and provide them to the other endpoint, gateway 205, as alternative SCTP destination addresses. However, the use of multiple connections via the same cellular connection does not increase availability all that much.

The mobile station B must also get the first IP address, IP A1 to be used by the gateway. Address IP A1 can be globally unique. It can even be equal to address Y1, in which case the mobile station needs to obtain only one address. However, preferably the mobile station obtains a private IP address, IP A1 that is local to the cellular system. In that case the gateway provides Network Address Translation between address Y1 and A1. Network address translation is known and far from trivial, because numerous applications embed raw IP addresses in the data they exchange with peers. In such cases address translation involves the substitution of address values in application-specific data. This type of operation is also known. A gateway that does this type of translation is often called an Application Level Gateway (ALG). Alternatively the mobile station gets the (private) IP address A1 from the gateway, and the gateway also assigns the external address Y1. It may even be that the mobile station will not be aware of the external address.

The applications in the mobile station use IP over the cellular connection. The application in the mobile station must run on SCTP, using the address A1. In the familiar SCTP way, the mobile station will attempt to inform the other endpoint, such as the second station 209, of the at least one IP address A1 associated with the cellular connection. The gateway will intercept or receive all SCTP messages and will provide dual functionality: when the mobile station tries to set up a SCTP association with an other, external endpoint by providing its destination IP address IP A1, the gateway will initiate a TCP connection with the other endpoint using address Y1. If required by the application, the gateway may need to set up multiple TCP connections with the other endpoint. When an other external endpoint initiates a TCP connection with the mobile station using address Y1, the gateway 205 sets up a new SCTP association with the mobile using address A1, or adds a new stream to an existing association on A1. If address A1 is different from address Y1, the gateway will perform address and port translation in the known Application Level Gateway manner. The external endpoint will only see IP address Y1.

The gateway will further perform a transport protocol translation between SCTP (with the mobile) and TCP/UDP (with the external endpoint). The translation is such that for reliable streams with the mobile station, the gateway uses TCP with the external endpoint, second station, while for unreliable streams with the mobile station, the gateway uses UDP with the external endpoint. When communicating with the mobile station, the gateway will use the address A1 as the primary SCTP address. Depending on the application, the Application Level Gateway may send data received on different SCTP streams from the mobile station to different IP ports of the other endpoint, and combine data received from the other endpoint from different IP ports onto separate SCTP streams of the same SCTP association.

The other endpoint, station 209 will use the external IP address (Y1) as the TCP/UDP destination address for the mobile station. In fact, due to the translation in the gateway, the external endpoint will not know that the mobile station is using SCTP. Likewise, the mobile station does not need to be aware of the transport protocol translation at the gateway. As far as the mobile is concerned it is communicating with the external endpoint over SCTP. Real-time applications preferably use Session Initiation Protocol (SIP) to setup the real time session over SCTP. The use of SIP over SCTP is being discussed in draft-ietf-sip-sctp-01.txt. It would be easy to write an Application Level Gateway for SIP. However, it is not sufficient to set up a session over SCTP. For this invention to work, the session bearer has to run over SCTP as well. SIP uses Session Description Language (SDL) to specify how the real-time data is to be sent between the endpoints. SIP relies on the Session Description Protocol (SDP) to provide media negotiation functionality. Currently SDP can specify that voice or video data will use RTP over UDP. One would need an extension to SDL to allow specification that voice or video runs over SCTP, on a best effort stream. Such an extension is well within the skill set of one of ordinary skill. The mobile or station uses the first IP connection 219 over its cellular connection. An application on station B that supports both cellular and wireless IP will run on SCTP and may be conditioned to run on SCTP when or if it determines that the station supports both cellular and wireless IP.

Referring to FIG. 2, the results of or situation after setting up the second IP connection 227 with a second IP address, IP A2 225 for the first wireless station B 203, where the first IP connection remains the primary connection and the second IP connection is a secondary connection between the first station and the gateway, with both connections existing concurrently are depicted. Setting up the second IP connection further includes searching for an appropriate connection, associating with a IP access point, and establishing connectivity with the gateway by informing the gateway of the second IP address 225 using SCTP. The searching, associating, and establishing are undertaken independent and transparent of the application supporting the communicating of the packet data. The searching for the appropriate wireless IP connection further includes one or more of determining that an available connection includes an access point and suitable services, that the station B is able to successfully authenticate with the access point, or that connectivity to gateway 205 is available. While our discussion here have described associating with a wireless IP access point that is an 802.11 access point it is expected that other local area access technologies will also benefit from the concepts and principles discussed here. Informing station B of the second IP address using SCTP, preferably, uses the second IP connection thereby initializing that connection.

In more detail an 802.11 capable mobile, such as station B 203 will regularly scan for an appropriate Wireless IP connection. When it finds an appropriate one it associates with the Access Point, authenticates, and establishes connectivity with the wired networks. Note that the BSS 228 as shown in FIG. 2 (gateway coupled to cellular core) in all likelihood will be associated with the cellular Service Provider (SP) and the wireless station B may even be able to use a SIM card for authentication. More generally, where the gateway or application level gateway is independent of the cellular system the BSS may not be associated with the SP. There may or may not be a roaming agreement between the cellular SP and the operator of the BSS. Interestingly, the invention works without a roaming agreement. The mobile would subscribe to and thus be able to authenticate independently with the BSS and gain access to the wired networks. This may be done without any knowledge to the cellular SP. In any event in the process, the wireless station may acquire a new IP address (via DHCP, for example). The mobile may also be able to use an existing IP address. In any case, the mobile has at least one second IP address, EP A2 225 that is used over the 802.11 IP connection 227. The mobile or station B then uses SCTP extension messages to instruct the other SCTP endpoint, the gateway 205, to add the second IP address as an alternative destination address for station B. During this process, the application on the mobile station B continues to use the first IP address over the cellular based EP connection to communicate with the gateway and the gateway relays this communication using IP address IP Y1 to the second station 609. While all this is done, the application on the second station 209 continues to use the IP address, IP Y1 and application data continues to flow through the cellular system.

Note that the acquisition of the second IP address is not done by the application. The radio/mobility software within and running on station B performs this task. This radio/mobility software also interacts with the SCTP layer to inform the gateway of the second IP address, IP A2 225. If the second IP address was previously associated with the cellular connection, the mobile station must first disassociate the second IP address from the cellular connection. In that case, it must first inform the gateway to delete the second IP address. If the cellular connection now fails for some reason, the other endpoint will automatically switch over to the second IP connection, here an 802.11 connection. The mobile station preferably should keep its 802.11 connection in the 'active' mode. Even though this error case is not handled in real-time, it already provides a more reliable connection than prior art approaches. Station B 203 can use the first or the second IP address and connection to instruct the gateway 205 to add the second IP address 225. Preferably, it uses the second connection and address because that will initialize the second connection, specifically establish the proper settings in the AP 229, the Distribution System 231 and any new routers, further gateways, or firewalls in the path between the station and the gateway.

FIG. 2 will also be used to explain the results of the next processes in the seamless handoff from one IP connection to another, here the cellular to the wireless IP system. Once the second IP connection is set up at some point the wireless station B determines that the second IP connection should be the primary connection. Determining that the second IP connection should be the primary connection may include one or more of determining that the quality of service form the first IP connection is degrading or here that a signal from the cellular base station is weakening, that tariffs for the second IP connection are favorable, or that services, such as higher bandwidth are needed or desired and that theses services are available via the second IP connection via the wireless IP network. In any event station B is now ready to switch over to the wireless IP access point 229 and use 802.11. Station B will bring the second connection with the 802.11 AP 229 to the 'active' mode, if it was not already 'active' and using SCTP extension messages inform the gateway that the second IP address 225 is now the primary SCTP destination address for station B. The gateway or SCTP application running thereon will now start using the second IP address 225 as the destination address for station B. Note that the switch is more or less immediate, and completely transparent to the application and the second station 209.

Likely the 802.11 AP 229 is indoors and cellular coverage may be marginal. After the second EP connection is set up and becomes the primary connection when station B observes that the cellular connection is deteriorating or at its sole discretion it may discontinue the first IP connection by informing the gateway using SCTP messages, to delete the first IP address and terminating any association using the first IP connection or here dropping the cellular IP connection. Note that the application will continue to operate normally, albeit over the second IP connection. Station B may inform the gateway of the new primary address, now IP A2 via the first connection and then wait for confirmation on that connection. Preferably, station B informs the gateway of the new primary address via the second IP connection, after bringing that connection to the 'active' mode. Preferably, station B times the switchover such that it starts during an idle or silent period in the time critical communication, such as a pause or a silence in a real-time voice conversation. Station B may choose to wait to drop the first IP connection 219 until it is out of the coverage area of the cellular system; since having more than one connection increases reliability. Station B may also associate the first IP connection with the 802.11 AP 229, after it has disassociated it from the cellular system, and inform the gateway that it has now become an alternative SCTP destination address.

Roaming back to cellular is essentially the reverse process. The application is running over SCTP using an 802.11 connection on a first IP address. The gateway is using a first IP address, IP A2 in FIG. 2, as the primary destination address. If needed, station B establishes a connection with the cellular system that supports data transfer on a second IP address, IP A1. The second IP address can be static or can be obtained dynamically. Special provisions may be needed to obtain the appropriate Quality Of Service, like the establishment of a secondary PDP context in UMTS systems. The software in the mobile station then uses the SCTP extension messages to inform the SCTP layer in the gateway about the availability of the second IP address. The software in station B then uses the SCTP messages to instruct the SCTP layer in the other endpoint to use the second IP address as the primary destination address. The mobile may now tear down the 802.11 IP connection. Before doing so, it should use the SCTP messages to instruct the SCTP layer in gateway 205 to delete the first IP address.

The above procedures can also be used for real time switching between any two wireless IP Access Points including across ESSs in 802.11 networks. The procedure can be used to switch between any two IP transport media, like between a wired LAN and a wireless IP LAN, or between a cellular network and a wired LAN. The common elements are the ability to run an application over SCTP at the mobile, route traffic through an Application Level Gateway that translates between SCTP and TCP/UDP, let the mobile station establish two IP connections that overlap in time, each using a different IP address and let the mobile use SCTP to manipulate the choice of the primary destination address at the ALG. Doing the above procedures will allow roaming or a seamless handoff from or amongst wireless IP connections that include one or more of an 802.11 access point, a Bluetooth access point, a HiperLAN access point, a wireless local area network (LAN) access point, a cellular station, a Code Division Multiple Access station and a Universal Mobile Telecommunication Service station, for example.

Figure 3:
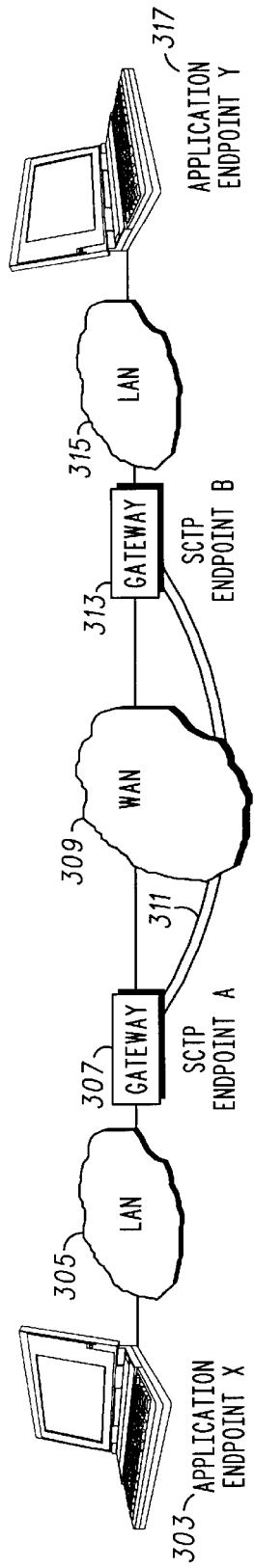
FIG. 3 through FIG. 5 show various diagrams depicting stream control transmission protocol (SCTP) tunneling according to the present invention.
Figure 4:
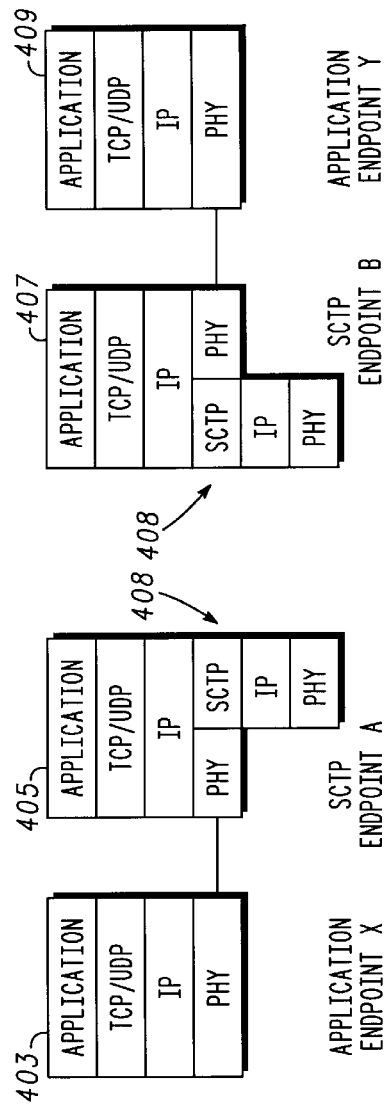
Figure 5:
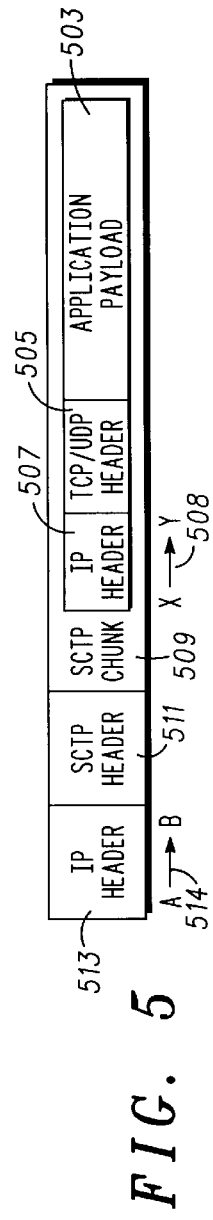

Another novel concept, referred to herein as SCTP tunneling, can be used in a variation of the system, gateway, first station and methodologies of FIG. 2. FIG. 3 through FIG. 5 show various diagrams depicting stream control transmission protocol (SCTP) tunneling and will be referred to in the following discussion and description. A generic application of a SCTP tunnel is shown in FIG. 3. In FIG. 3 the tunnel 311 connects two application endpoints, X and Y 303 and 307 and two networks 305, 315 via a third network 309, which can be a WAN (wide area network), a MAN (medium area network) or a LAN (local area network). The entities that form the endpoints, A and B, of the SCTP tunnel (the gateways 307, 313) wrap and unwrap the IP packets. They know each other's IP addresses and use them to set up a SCTP association or connection. As part of the association, the SCTP endpoints define at least two independent streams, one of which is set up to be reliable, the other one remains unreliable.

The protocol stacks are shown in FIG. 4. The entity that wraps the packets, gateway 307 or 313 checks whether the original packet is TCP or UDP. If it is TCP the entity forwards the packet in a reliable SCTP stream; if it is UDP it uses an unreliable stream. If the original packet by chance is an SCTP packet, meaning the originating endpoint is running an SCTP application, the entity may just forward the packet without modification, or with minimal Network Address Translation (NAT). Note that the other SCTP endpoint or gateway could do an application level translation etc if its corresponding application endpoint is not running over SCTP. As shown in FIG. 4 the protocol stack 403 depicts an application running over either TCP or UDP for an IP connection and then the physical layer. These correspond to the left portion of the protocol stack 405 for the gateway 307, SCTP endpoint A. The right portion of the stack 405 shows wrapping the original packet with an SCTP header 408 and then another IP header. This again corresponds to the left portion of the protocol stack 407 for the gateway 313 or SCTP endpoint B. After unwrapping the packet, shown as the right portion of the stack 407, the gateway 313 forwards the packet to the application endpoint 317 in the form shown as protocol stack 409. Note that the stack 403 is layer for layer identical to stack 409. Note that if the tunnel is across an untrusted network the original application, TCP/UDP, and IP layers can be secured using elements of the Security Architecture for the Internet Protocol, IETF RFC 2401, such as interoperability host-to-host pipes, encapsulated tunnels, or Virtual Private Networks (VPNs). The Implementation of security within this invention is within the skill set of one of ordinary skill. Depending on the approach taken to securing the transmission of information as described by this invention, additional protocol layers may be inserted at various points within the various protocol stacks, thus providing a virtual private network.

FIG. 5 shows an example of a packet that is being tunneled over SCTP according to the protocol stacks of FIG. 4 and network of FIG. 3. Normally each original TCP or UDP packet, including application payload 503, TCP/UDP header 505 and IP header 507 going from endpoint X to Y 508 becomes an SCTP message and is placed in an individual SCTP chunk 509. A single SCTP packet can transport multiple chunks. This property of SCTP can be used to wrap multiple packets into a single SCTP tunnel packet with an SCTP header 511. The resulting SCTP packet has an IP header 514 added that identifies the endpoints A and B 514. It is possible to wrap TCP and UDP packets into the same SCTP packet. The applications at the source and destination, here endpoints X and Y, 303, 317 of the original TCP or UDP packets are not aware of the tunneling and do not need to know SCTP. This points to a distinct advantage of SCTP tunneling, namely that one can get the advantages of SCTP and apply those advantages to legacy (TCP/UDP) applications. Another advantage of SCTP tunneling is that it provides protection against denial of service attacks in the form of TCP SYN flooding.

An SCTP tunnel endpoint can also be on the same device as the application endpoint. An example of this is given in FIG. 6 where the SCTP tunnel endpoint B 622 is on the first station 604, which may be a wired or wireless device. In this configuration the protocol stacks in FIG. 4 labeled 'Y and 'B' may optionally be or are effectively collapsed into a single stack that looks like stack 407. The gateway 613 in the figure can be associated with the network of the leftmost host, or with that of the rightmost one and the connection between the gateway and the first station 604 can be any combination of wired and wireless connections.

SCTP tunneling is counter-intuitive because of the large amount of overhead that SCTP adds to a packet. SCTP tunneling is done at the transport layer. As can be seen from FIG. 5, this increases the overhead. The wrapper consists of an IP header 513, a 12-byte SCTP common transport layer header 511 and a 16-byte SCTP chunk header 509. In the wired domain this may be acceptable. However, the overhead can become significant when the invention is being used to transport real time voice over wireless. Voice over IP typically consists of a regular stream of very small voice encoding packets, each one preceded by an IP header, a UDP header and a RTP (real time protocol) header. The invention would add an IP header, an SCTP header and a chunk header. However there are known techniques for IP header compression. For example, RFC 1332 as updated by RFC 3241 describes Van Jacobson TCP/IP header compression. Van Jacobson TCP/IP header compression reduces the size of the TCP/IP headers to as few as three bytes. It uses the property that most fields in a stream are either constant or vary in a predictable way. Similar schemes as specified in RFC 2509 have been applied to RTP/UDP/IP header compression. The compression of chunk/SCTP/IP is being discussed (draft-schmidtrohc-sctp-requirements-00.txt). Using similar techniques it is possible to efficiently compress a voice stream that is being tunneled over SCTP. The clear advantage of SCTP tunneling is the possibility of doing real time seamless handoff and thus supporting mobility between diverse networks and service providers provided they use IP packet data connections.

Referring to FIG. 6 and FIG. 7, a system level diagram of another embodiment of providing seamless handoff of communications between two IP connections will be discussed and described. FIGS. 6 and 7 depict using SCTP tunneling to accomplish the objective. Basically FIG. 6 shows a device or station 602 that has an IP address, EP X1, 607 and is an application end point X 603. Station 602 is communicating packet data with station 604 as the other application endpoint Y 605 at IP address, IP Y1, 609. More specifically station 602 is communicating via network 1 611 with the gateway 613 and this gateway is communicating via network2 615 and a wired or wireless connection 617 with station 604 and the application endpoint 605. Gateway 613 is an SCTP endpoint A 620 with an IP address IP A1 621 that uses SCTP tunneling 619 to establish an IP connection or SCTP association with another SCTP endpoint B 622 with an IP address, IP B1 623, located with station 604. A second IP connection between SCTP endpoints A and B 620 and 622 is depicted through network 3 625 via a wired or wireless connection 627. Here the gateway uses IP address, IP A2 631 to set up an SCTP tunnel 629 with endpoint B 622 using IP address 633.

This system is suitable for effecting a seamless handoff from a first Internet Protocol (IP) connection 617 to a second IP connection 627 where the method includes: communicating a packet data communication between a first station 604 and a gateway 613 using the first IP connection and a first IP address IP B1 623 for the first station, where the gateway 613 relays the packet data communication with a second station 602; setting up the second IP connection 629 with a second IP address IP B2 633 for the first station, the first IP connection being a primary connection and the second IP connection being a secondary connection between the first station and the gateway, the first and the second IP connection existing concurrently; determining that the second EP connection should be the primary connection between the first station and the gateway; and changing the second IP connection to the primary connection by informing the gateway that the second IP address is the primary address using stream control transmission protocol (SCTP) messages, wherein the packet data communication is immediately switched over to the second IP connection.

This system is suitable for doing all of the functions or procedures discussed above with reference to FIG. 2 as well as providing handoffs where both stations are running legacy TCP/UDP applications. The processes and motivations for doing a handoff are similar. Since the first IP connection uses SCTP tunneling facilitated by the gateway for communicating packet data communication with the first station, the first station can interact with the second station when each are running either a Transport Communication Protocol (TCP) or Universal Datagram Protocol (UDP) based application. Similarly the second IP connection uses SCTP tunneling facilitated by the gateway. An advantage of this system is that the gateway does not need network address translation or Application Level Gateway functionality. For the preferred embodiment, the SCTP endpoint B 622 is located on the station 604. The station must obtain at least one IP address (IP Y1 609) that it uses for communication with external devices like the application endpoint X 603 at the second station 602. This address can be obtained in a known way (by DHCP, by PDP context activation in a UMTS cellular system, or by static assignment as in Mobile IP). The address must be chosen such that all traffic for the mobile on address Y1 will be routed to a specific gateway 613 first. The gateway will then forward the traffic to the mobile. This type of arrangement is common; it is used to route a mobile's traffic to the GGSN gateway of a UMTS system, or to the Home Agent in a Mobile IP architecture. The mobile endpoint B may or may not use additional external IP addresses (Y2, Y3) that have the same property. The mobile or station 604 must also get at least one IP address that can be used by the gateway. Here we call it IP address B1 623. Address B1 can be globally unique. It can even be equal to address Y1, in which case the mobile needs to obtain only one address. However, preferably the station 604 obtains a private IP address B 1 that is local to the network that connects the gateway and the station. The station must also know the address of the gateway (IP A1 621). The gateway and the SCTP endpoint B 622 on the station establish a SCTP association using the addresses A1 and B1 as the primary addresses. The gateway and the SCTP endpoint on the station use SCTP tunneling to transport datagrams between the station (using IP address Y1) and an external device (with IP address X1).

To prepare for a switchover or handoff to an alternative connection, the station 604, referred to below variously as mobile, mobile station, device etc. must do the following. The mobile station establishes a new connection with the gateway. The new connection may be wired or wireless. While the new connection is established, the original connection must remain in operation. The establishment may involve registration with a cellular network, association with an 802.11 access point, or connection of a cable into a LAN connector. The mobile station must get at least one IP address (B2) that can be used by the gateway over the new connection. Address IP B2 can be globally unique. However, preferably the mobile station obtains a private IP address B2 that is local to the network that connects the gateway and the mobile device. The mobile station must also know an IP address of the gateway that is reachable over the new connection. Preferably it is a different address (A2). The mobile station now uses the SCTP extensions to instruct the Gateway to add the second IP address (B2) as an alternative destination address. During this process, the application on the mobile station continues to use the original gateway address (A1) as the primary SCTP address and the gateway continues to use the original mobile address (B1) as the primary destination address (bold in FIG. 6). The tunneling thus continues over the original connection.

Note that here as well as in the system of FIG. 2 the acquisition of the second IP address A2 is not done by the application. It is done by the radio/mobility software in the mobile station. This radio/mobility software also interacts with the SCTP layer to inform the other SCTP endpoint of the new address. If the second IP address A2 was previously associated with the original connection, the mobile station must disassociate the second IP address from that connection. In that case, it must first inform the other SCTP endpoint to delete address A2. If the original connection now happens to fail, the other SCTP endpoint will automatically switch over to the new connection. The mobile preferably should keep the new connection in the 'active' mode. Even though this error case is not handled in real-time, it already provides a more reliable connection than known systems. The mobile SCTP endpoint can use the first or the second IP address (B1 or B2) to instruct the other SCTP endpoint (the gateway) to add the second IP address. Preferably, it used the second address B2, because that will establish the proper settings in the network between the SCTP endpoints (it initializes the new route).

The mobile station is now ready for the handover. It may want to switch because cellular signal quality on the original connection decreases, because the new connection is cheaper, or because it is being signaled that he original connection will be disconnected. The mobile station will: bring the new connection to the 'active' mode, if it was not already 'active' and use the SCTP extensions to inform the other SCTP endpoint (the gateway) that the second IP address B2 must be used as the primary SCTP destination address. As a result, the original primary address (B1) becomes a secondary address. If the new connection uses a new address (A2) at the gateway, the SCTP endpoint in the mobile station starts to use that new address as the primary SCTP destination address. The SCTP tunnel will now run over the new connection. Note that the switch is fast and completely transparent to the applications. The mobile station (or the gateway) may now tear down the original tunnel and the original connection. The mobile station informs the other SCTP endpoint (the gateway) that it must delete the first IP address B1. The mobile station or the infrastructure drops the original connection. Note that the application will continue to operate normally. Preferably, the mobile station chooses the timing of the handover such that it starts during a silent period in the real-time voice conversation.

The mobile may defer discontinuing the first connection until it no longer has service as having more than one connection increases reliability. Note that the original and the new connection can each be wired or wireless. Typical applications of the SCTP tunneling principles and concepts allow real-time handover: from a wired LAN to a Wireless IP connection, from a wired LAN to a cellular IP connection, from a Wireless IP to a wired LAN connection, from a Wireless IP to a cellular IP connection, from a Wireless IP connection at one Access Point to a Wireless IP connection at another Access Point, from a cellular IP to a wired LAN connection, and from a cellular IP to a Wireless IP connection.

Referring to FIG. 7 an alternative topology or network architecture is depicted that uses SCTP tunneling to effect a seamless handoff between IP connections. This architecture applies when the SCTP endpoint is not in the mobile station but rather in the network infrastructure. The steps for the handoff with the alternative architecture are executed in much the same fashion as they were in the topology of FIG. 6. FIG. 7 shows the station 602 as an application endpoint 603 with IP address 607 communicating with station 604 as the application endpoint 605 via network 1 611 and the SCTP end point A 720 or gateway, with IP address IP A1 721, that anchors one end of the SCTP tunnel 717 through network2 715 to SCTP endpoint B 722 or gateway with IP address IP B1 723 that operates to unwrap the SCTP packets and forward the communications via network3 to station 604. A second IP connection from the SCTP endpoint A 720, using IP address IP A2 731, is via the network4 725 and SCTP tunnel 729 to a new SCTP endpoint B 732 with address IP B2 733 and then via network5 743 to the station 604 and application endpoint Y 605.

One obstacle with this topology is that the new SCTP endpoint B 732 needs to learn about the other SCTP endpoint A 720. There are several ways that this can be implemented. The mobile station 604, after it establishes the new connection, can identify the other endpoint (A) to the entities, including endpoint B 732 along the new connection. Problems with this solution are that it cannot be implemented in a legacy mobile and that the mobile must somehow get information about the original SCTP tunnel. Another solution is for the infrastructure to coordinate the setup of the SCTP endpoints. Information that the mobile needs or deserves a tunnel may be kept in an infrastructure database (HLR for example). Another approach is to have the fixed SCTP endpoint (A) take responsibility for the establishment of the new SCTP endpoint. There is a second difficulty with this variation, namely that it is only useful in systems that allow the mobile to retain its original IP address Y1 when it moves to the new connection. These difficulties limit the applicability of this configuration to specific application areas. One such area is an Extended Services Set in an Wireless IP system (802.11). The fixed SCTP endpoint A would reside on the interface to the external network, the portal in FIG. 2, while the SCTP endpoint B 722 and 732 would reside in the Access Points for the 802.11 wireless IP system.

Figure 8:
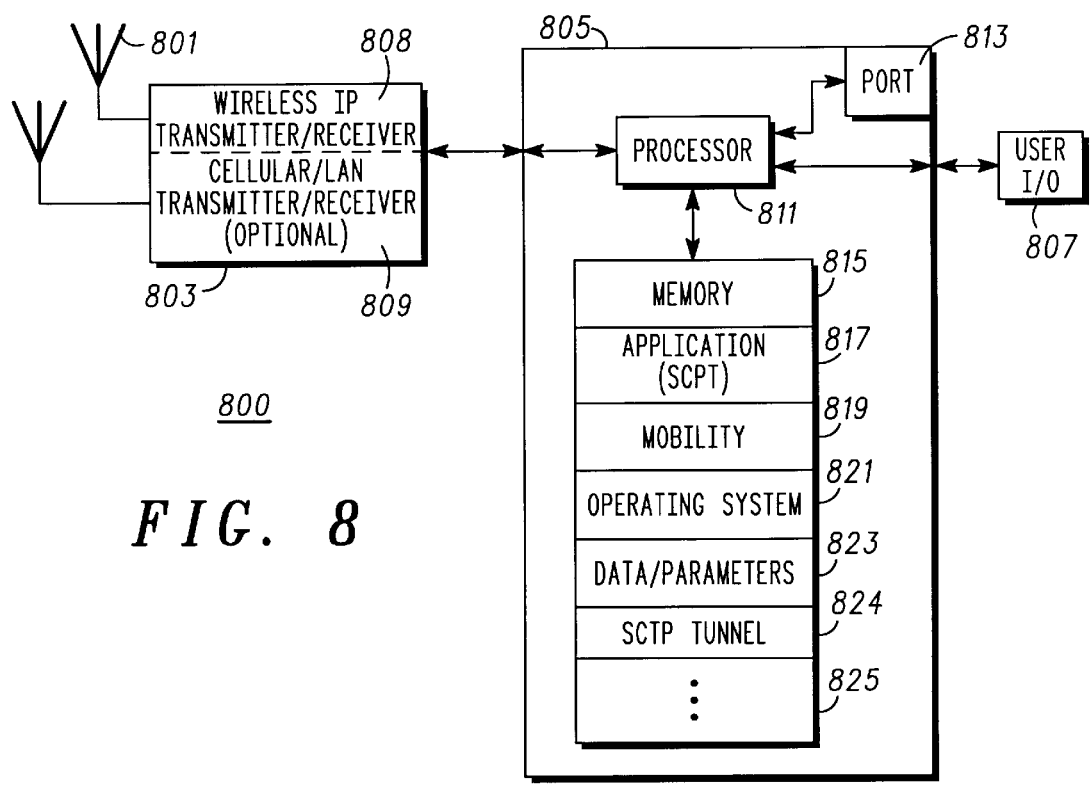
FIG. 8 depicts functional block diagram of a preferred embodiment of a wireless communications unit suitable for use in the systems of FIG. 2, FIG. 6, and FIG. 7 according to the present invention.

Referring to FIG. 8 a functional block diagram of a preferred embodiment of a wireless communications unit 800 suitable for use in the systems of FIG. 2 through FIG.

7 as the wireless station or first station B will be discussed and described. The wireless communications unit 800 is arranged and constructed to effect a handoff from a first Internet Protocol (IP) connection to a second IP connection for packet data communications and is especially suited for a handoff of a time critical communication. The wireless communications unit includes, coupled to a known antenna 801, a conventional wireless transceiver 803 and a controller 805 cooperatively arranged for communicating a packet data communications with a gateway using the first IP connection and a first IP address for the wireless communications unit, the gateway for relaying the communications to a second station. The controller is further coupled to a conventional user input output 807, including for example a display, keyboard, or audio transducers, and is operable for: setting up the second IP connection with a second IP address for the wireless communications unit where the first IP connection is a primary connection and the second IP connection is a secondary connection with the gateway, with both existing concurrently; determining that the second IP connection should be the primary connection; and changing the second IP connection to the primary connection by informing the gateway that the second IP address is the primary address using stream control transmission protocol (SCTP) messages, wherein the packet data communication is immediately switched over to the second IP connection.

To do so the wireless transceiver 803 will require a wireless IP transceiver 808 and may require an additional cellular or local area network transceiver 809 in an exemplary situation where the first and second IP connections are supported by wireless networks. The controller 805 includes a processor 811, preferably a microprocessor or digital signal processor both known and widely available, coupled to an optional port 813 that provides an interface to one or more devices such as a portable computer, personal digital assistant, network interface card, modem, or the like, one or more of which may be fully integrated with the wireless communications unit. For example, the port is suitable for coupling to the external device, such as a portable computer, and the wireless communications unit supports or acts as an SCTP endpoint supporting an SCTP tunnel based IP connection with the gateway. Thus the port can exchange one of a Transport Communication Protocol (TCP) and Universal Datagram Protocol (UDP) communications with the external device, thereby providing TCP/UDP communications between the external device and the second station when each are running a TCP/UDP based application. The processor is inter-coupled to a memory 815 that includes, as appropriate for the particular unit, some combination of RAM, ROM, PROM, EEPROM or magnetic memory that is used to store software routines or instructions as well as data and parameters for such routines and instructions and the unit, that when executed by the processor results in the wireless communications unit operating as required to support various known functions as well as handoff processes as disclosed herein. These software instructions or routines include one or more applications 817, for example an email client, browser, or voice or video over IP, that support communication with other stations or hosts and run on top of an SCTP transport layer, except when using an SCTP tunnel, and mobility management routines 819 that handles various duties associated with roaming or moving from one access point to another, including handoff procedures as well as an SCTP tunneling routine 824 for supporting the tunneling activities described above with reference to FIG. 6. Further included is the basic and known operating system 821, data and parameters information 823, and many other routines 825 that one of ordinary skill would recognize and be familiar with.

Note that for the wireless communications unit in order to effect a handoff from or to an IP connection via a cellular base station to or from an IP connection via a local area wireless IP network, such as an 802.11 network will require that the wireless transceiver 803 include a cellular transceiver and capabilities to operate on cellular systems. If the handoff is from one wireless IP network to another like such network the wireless transceiver will only require the wireless IP transceiver 808 in many instances as most of these networks are set up so that one transceiver is able to maintain multiple IP connections. As above discussed the wireless communications unit will operate in accordance with SCTP conventions and independent of applications to communicate its own destination IP addresses and establish the proper priorities of such IP addresses and thus IP connections with other endpoints or stations and thereby effect a handoff of communications in a virtual real time manner between IP connections as judged appropriate based on similar motivations and circumstances as earlier discussed.

Figure 9:
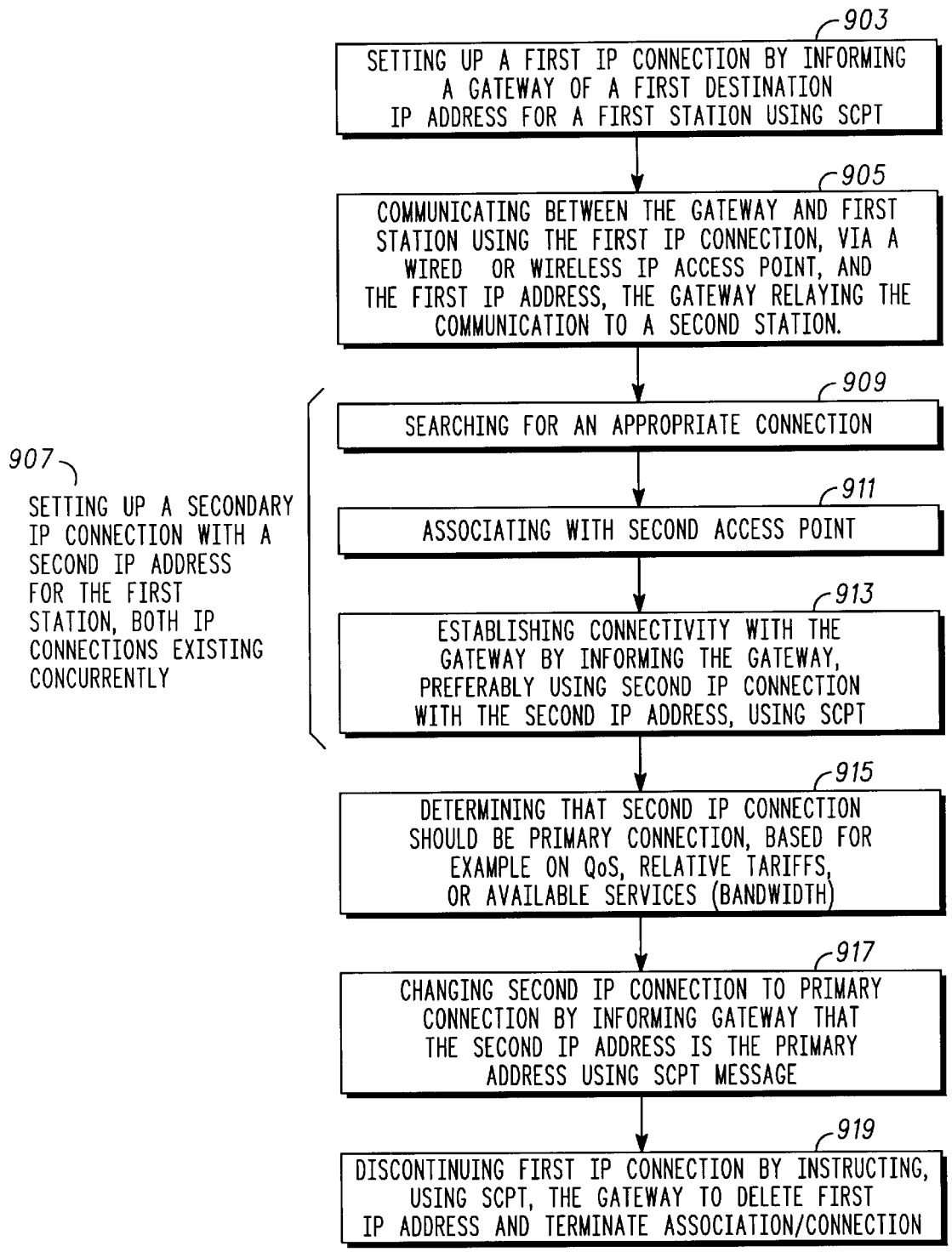
FIG. 9 shows a flow chart of a preferred method of effecting a handoff of communications between two IP connections.

In conclusion with reference to FIG. 9 a flow chart of a preferred method of effecting a handoff of a time critical communications between two IP connections will be discussed and described. This discussion will be in the nature of a summary and thus at an overview level as most of the concepts and principles have been discussed above. This method may be practiced advantageously, for example, by the wireless communications unit of FIG. 8 operating in a suitable system such as those shown in FIG. 2, FIG. 6, or FIG. 7. FIG. 9 depicts a method 900 of effecting a handoff from a first Internet Protocol (IP) connection to a second IP connection and begins at 903 with setting up a first IP connection by informing a gateway of a first destination IP address for a first station using SCTP messages. By SCTP conventions this will be the primary IP address and thus IP connection between the two SCTP endpoints. Then at 905 the method depicts communicating between the gateway and first station via a wired or wireless IP access using the first IP connection and first IP address for the first station where the communications is relayed to a second station by the gateway. If the gateway is an application level gateway the communication between the first station and the gateway will be supported by an application running on an SCTP transport layer and the communication will be relayed after protocol and network address translation to either TCP or UDP packets for the second station. Alternatively the gateway can be one end of an SCTP tunnel in which case it will unwrap the SCTP packets and relay them to the second station.

At 907 the method shows setting up the second IP connection with the second IP address for the first station where the first IP connection is a primary connection and the second IP connection is a secondary connection with both existing concurrently. The second IP connection may be an SCTP tunnel as was noted above. In more detail setting up the second connection includes searching for an appropriate connection 909, associating with a second access point 911, such as a wireless IP access point, and establishing connectivity with the gateway by informing, preferably using the second IP connection, the gateway of the second IP address using SCTP messages. Note that 909, 911, and 913 are preferably undertaken independently of and transparently to the application supporting the communicating. Searching 909 for the appropriate wireless IP connection may include one or more of determining that an available connection includes an access point and suitable services, that the first station is able to successfully authenticate with and access the access point, and that connectivity to the gateway is available. Associating with a wireless IP access point can include associating with one of an 802.11 access point, a Bluetooth access point, a HiperLan access point, a local area network (LAN) access point, etc. according to the provisions for each such access point.

Then 915 shows determining that the second LP connection should be the primary connection, based for example on one or more of determining that the QOS (quality of service) of the first IP connection is degrading, such as a signal weakening, that tariffs for the second IP connection are favorable, or that services, such as bandwidth or security, etc. are desired and available via the second IP connection. Next, 917 shows changing the second IP connection to the primary connection by informing the gateway that the second IP address is the primary address using SCTP messages. Doing this results in immediately switching the time critical communication over to the second IP connection. Then 919 indicates as an optional process, when the second IP connection becomes the primary connection, discontinuing the first IP connection by for example instructing the gateway to delete the first IP address using SCTP messages and terminating any session via the first IP access point.

The apparatus and methods discussed and described above, and the inventive principles and concepts thereof are intended to and will alleviate problems caused by the lack of mobility considerations with and between prior art IP systems. Using these principles of establishing a secondary IP connection using SCTP commands and messages that exists concurrently with a first IP connection between endpoints using SCTP transport layers will allow a communications device to effect a handoff of time critical communications at the will of the communications device and thus facilitate connectivity for mobile individuals. For example these principles and concepts can be used to effect a handoff between disparate cellular packet data systems that do not otherwise support a fast handoff, such as UMTS and CDMA systems as well be apparent to one of ordinary skill given the teachings herein.

This disclosure is intended to explain how to fashion and use various embodiments in accordance with the invention rather than to limit the true, intended, and fair scope and spirit thereof. The foregoing description is not intended to be exhaustive or to limit the invention to the precise forms disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of effecting a seamless handoff from a first Internet Protocol (IP) connection to a second IP connection, the method comprising:

communicating a packet data communication between a first station and a gateway using the first IP connection and a first IP address for said first station, said gateway relaying said packet data communication with a second station;

setting up the second IP connection with a second IP address for said first station, the first IP connection being a primary connection and the second IP connection being a secondary connection between said first station and said gateway, said first and said second IP connection existing concurrently, said primary connection and said secondary connection being, respectively, a primary stream control transmission protocol (SCTP) connection and a secondary SCTP connection, said setting up the second IP connection further includes searching for an appropriate IP connection, associating with an IP access point, and establishing connectivity with the gateway by informing said gateway of said second IP address using SCTP;

determining that the second IP connection should be said primary connection between said first station and said gateway; and changing the second IP connection to said primary connection by informing said gateway that the second IP address is the primary address using stream control transmission protocol (SCTIP) messages, wherein said packet data communication is immediately switched over to the second IP connection.

2. The method of claim 1 further including, initiating the first IP connection by informing said gateway of said first IP address using SCTP messages before starting said communicating.

3. The method of claim 1 wherein said communicating between said first station and said gateway uses SCTP over the first IP connection and the second IP connection and said gateway uses one of Transport Communication Protocol (TCP) and Universal Datagram Protocol (UDP) to relay said packet data communication with said second nation.

4. The method of claim 1 wherein said searching, said associating, and said establishing are undertaken independent of an application supporting said communicating.

5. The method of claim 1 wherein said searching for said appropriate IP connection further includes one of determining that an available connection includes an access point and suitable services, that said first station is able to successfully authenticate with said access point, and that connectivity to said gateway is available.

6. The method of claim 1 wherein said informing said gateway of said second IP address using SCTP uses said second IP connection thereby initializing said second IP connection.

7. The method of claim 1 wherein said determining that the second IP connection should be said primary connection further includes one of determining that the first IP connection quality of service is degrading, that tariffs for the second IP connection are favorable, and that services are desired that are available via the second IP connection.

8. The method of claim 1 further including, when the second IP connection becomes said primary connection, discontinuing the first IP connection by instructing, using SCFP messages, said gateway to delete said first IP address and terminating any association using said first IP address.

9. The method of claim 1 wherein said gateway in said relaying said packet data communications further performs a translation between an external IP address corresponding to said first station and one of said first IP address and said second IP address for said first station.

10. The method of claim 9, wherein said gateway further translates between SOTIP on one of the first and the second IP connections with said first station and one of Transport Communication Protocol (TOP) and Universal Datagram Protocol (UDP) to relay said packet data communication with said second station.

11. The method of claim 1 wherein the first IP connection uses SCTP tunneling facilitated by said gateway for said communicating said packet data communication with said first station wherein said first station can interact with said second station when each are running one of a Transport Communication Protocol (TOP) and Universal Datagram Protocol (UDP) based application.

12. The method to claim 11 wherein said second IP connection uses SCTP tunneling facilitated by said gateway.

13. A The method of claim 1 wherein one of the first and the second IP connection is a wireless IP connection.

14. The method of claim 13, wherein the wireless IP connection includes one of an 802.11 access point, a Bluetooth access point, a HiperLan access point, a wireless local area network (LAN) access point, a cellular station, a Code Division Multiple Access station and a Universal Mobile Telecommunication Service station.

15. A wireless communications unit arranged and constructed to effect a handoff from a first Internet Protocol (IP) connection to a second IP connection, the wireless communications unit comprising:

a wireless transceiver and a controller cooperatively arranged for communicating a packet data communication with a gateway using the first IP connection and a first IP address for the wireless communications unit, said gateway for relaying said packet data communication to a second station;

said controller further for:

setting up the second IP connection with a second IP address for the wireless communications unit, the first IP connection being a primary connection and the second IF connection being a secondary connection between the wireless communications unit and the gateway, the first and the second IP connection existing concurrently, said primary connection and said secondary connection being respectively, a primary stream control transmission protocol (SCTP) connection and a secondary SCTP connection, said setting up the second IP connection further comprises searching for an appropriate wireless IP connection, associating with a wireless IP access point, and establishing connectivity with said gateway by informing said gateway of the second IP address using SCTP;

determining that the second IP connection should be said primary connection; and changing the second IP connection to said primary connection by informing said gateway that said second IP address is said primary address using stream control transmission protocol (SCTP) messages, wherein said packet data communication is immediately switched over to the second IP connection.

16. The wireless communications unit of claim 15 wherein said wireless transceiver and said controller initiate the first IP connection by informing said gateway of said first IP address using SCTP messages before starting said communicating.

17. The wireless communications unit of claim 15 wherein said communicating with said gateway uses SCTP over the first IP connection and the second IP connection whereas said gateway uses one of SCTP, Transport Communication Protocol (TCP), and Universal Datagram Protocol (UDP) to relay said packet data communication with said second station.

18. The wireless communications unit of claim 15 wherein said searching, said associating, and said establishing are undertaken independent of an application supporting said communicating.

19. The wireless communications unit of claim 15 wherein said searching for said appropriate wireless IP connection further includes one of determining that an available connection includes an access point and suitable services, that said wireless communications unit is able to successfully authenticate with said access point, and that connectivity to said gateway is available.

20. The wireless communications unit of claim 15 wherein said informing said gateway of said second IP address using SCTP uses said second IP connection thereby initializing said second IP connection.

21. The wireless communications unit of claim 15 wherein said determining that the second IP connection should be said primary connection further includes one of determining that the first IP connection quality of service is degrading, that tariffs for the second IP connection are favorable, and that services are desired that are available via the second IP connection.

22. The wireless communications unit of claim 15 further including, when the second IP connection becomes said primary connection, discontinuing the first IP connection by instructing, using SCTP messages, said gateway to delete said first IP address and terminating any association using said first IP address.

23. The wireless communications unit of claim 15 wherein said gateway in said relaying said packet data communications further performs translation between an external IP address corresponding to said wireless communications unit and one of said first IP address and if said second IP address for said wireless communications unit.

24. The wireless communications unit of claim 23 wherein said gateway further translates between SCTP on one of the first and the second IP connections with said wireless communications unit and one of Transport Communication Protocol (TCP) and Universal Datagram Protocol (UDP) to relay said packet data communication with said second station.

25. The wireless communications unit of claim 15 wherein the first IP connection uses SCTP tunneling facilitated by said gateway for said communicating said packet data communication with said wireless communications unit wherein said wireless communications unit interacts with said second station when each are running one of a Transport Communication Protocol (TCP) and Universal Datagram Protocol (UDP) based application.

26. The wireless communications unit of claim 25 wherein the second IP connection uses SCTP tunneling facilitated by said gateway.

27. The wireless communications unit of claim 15 further including a port for coupling to an external device, wherein the first IP connection uses SCTP tunneling facilitated by said gateway for said communicating said packet data communication with said wireless communications unit, said port for exchanging one of a Transport Communication Protocol (TCP) and Universal Datagram Protocol (UDP) with said external device, thereby providing TCP/UDP communications between the external device and said second station when each are running a TCP/UDP based application.

28. The wireless communications unit of claim 15, wherein the first and the second IF connection are each one of an 802.11 access point, a Bluetooth access point, a Hip access point, a wireless local area network (LAN) access point, a cellular station, a Code Division Multiple Access station and a Universal Mobile Telecommunication Service station.

29. A gateway arranged and configured to facilitate a seamless handoff from a first Internet Protocol (IP) connection to a second 12 connection, the gateway operable for:

communicating a packet data communication with a first station using the first IP connection and a first IP address for said first station and for relaying said packet data communication with a second station;

setting up the second IP connection with a second IP address for said first station, the first IP connection being a primary connection and the second IP connection being a secondary connection with said first station, said first and said second IP connection existing concurrently, said primary connection and said secondary connection being, respectively, a primary stream control transmission protocol (SCTP) connection and a secondary SCTP connection, said setting up the second IP connection further comprising receiving an SCTP message including said second IP address for said first station;

receiving a stream control transmission protocol (SCTP) message indicating that the second IP connection should be said primary connection with said first station; and changing the second IP connection to said primary connection by using the second IP address as the primary address for said packet data communications, wherein said packet data communication is immediately switched over to the second IP connection.

30. The gateway of claim 29 further including, initiating the first IP connection by receiving an SCTP message indicating that said first IP address corresponds to said first station before starting said communicating.

31. The gateway of claim 29, wherein said communicating with said first station uses SCTP over the first IP connection and the second IP connection and said relaying said packet data communication with a second station uses one of Transport Communication Protocol (TCP) and Universal Datagram Protocol (UDP).

32. The gateway of claim 31 wherein said receiving said SCTP message including said second IP address uses said second IP connection thereby initializing said second IP connection.

33. The gateway of claim 29 further including when the second IP connection becomes said primary connection, discontinuing the first IP connection by receiving an SCTP message indicating to said gateway to delete said first IP address and terminate any association using said first IP address.

34. The gateway of claim 29 wherein said relaying said packet data communications further includes translating between an external IP address corresponding to said first station and one of said first IP address and said second IP address for said first station.

35. The gateway of claim 34 wherein said translating further includes translating between SCTP on one of the first and the second IP connections with said first station and one of Transport Communication Protocol (TCP) and Universal Datagram Protocol (UDP) when said relaying said packet data communication with said second station.

36. The gateway of claim 29 further using SCTP tunneling to support the first IP connection for said communicating said packet data communication with said first station wherein said first station can interact with said second station when each are running one of a Transport Communication Protocol (TCP) and Universal Datagram Protocol (UDP) based application.

37. The gateway of claim 36 wherein said gateway uses SCTP tunneling to support said second IP connection.

* * * * *

UNITED STATES PATENT AND TRADEMARK OFFICE
CERTIFICATE OF CORRECTION

PATENT NO.    : 6,768,726 B2  
DATED         : July 27, 2004  
INVENTOR(S)   : Dorenbosch et al.

Page 1 of 1

It is certified that error appears in the above-identified patent and that said Letters Patent is hereby corrected as shown below:

Column 18,
Line 63, please delete "SOTIP" and insert -- SCTP --.
Line 65, please delete "TOP" and insert -- TCP --.

Column 19,
Line 6, please delete "TOP" and insert -- TCP --.
Line 31, please delete "IF" and insert -- IP --.

Column 20,
Line 59, please delete "IF" and insert -- IP --.
Line 60, please delete "Hip" and insert -- HiperLan --.
Line 67, please delete "12" and insert -- IP --.

Column 22,
Line 3, please delete "31" and insert -- 29 --.

Signed and Sealed this

Twenty-sixth Day of October, 2004

JON W. DUDAS
*Director of the United States Patent and Trademark Office*